(12) United States Patent
Keller et al.

(10) Patent No.: US 7,637,537 B2
(45) Date of Patent: Dec. 29, 2009

(54) LAMINATED MULTI-LAYER CARD WITH AN INLAID SECURITY ELEMENT IN THE FORM OF RELIEF STRUCTURES

(75) Inventors: Mario Keller, Bad Endorf (DE); Günter Endres, Passau (DE); Manfred Engl, München (DE)

(73) Assignee: Giesecke & Devrient GmbH, Munchen (DE)

( * ) Notice: Subject to any disclaimer, the term of this patent is extended or adjusted under 35 U.S.C. 154(b) by 756 days.

(21) Appl. No.: 10/203,619

(22) PCT Filed: Feb. 20, 2001

(86) PCT No.: PCT/EP01/01901

§ 371 (c)(1), (2), (4) Date: Dec. 2, 2002

(87) PCT Pub. No.: WO01/62516

PCT Pub. Date: Aug. 30, 2001

(65) Prior Publication Data

US 2003/0127847 A1    Jul. 10, 2003

(30) Foreign Application Priority Data

Feb. 21, 2000    (DE)    ................. 100 07 916

(51) Int. Cl.
*B42D 15/00*    (2006.01)

(52) U.S. Cl. .................. 283/109; 283/94; 283/74; 283/87; 283/91

(58) Field of Classification Search .............. 283/72, 283/74, 86, 91, 93, 94, 107, 108, 109, 110, 283/111; 428/40.1, 42.1, 41.8, 86, 138, 213, 428/141, 156, 457, 901, 902, 913, 915, 916; 430/1, 2

See application file for complete search history.

(56) References Cited

U.S. PATENT DOCUMENTS 4,171,864 A    10/1979    Jung et al.
4,544,181 A    10/1985    Maurer et al.

(Continued)

FOREIGN PATENT DOCUMENTS

DE    2451732    5/1976

(Continued)

OTHER PUBLICATIONS

Rankl, Wolfgang, Handbuch der Chipkarten, pp. 52-59.

*Primary Examiner*—Dana Ross
*Assistant Examiner*—Jamila Williams
(74) *Attorney, Agent, or Firm*—Bacon & Thomas, PLLC

(57) ABSTRACT

A card, in particular credit card, identity card, bank card or the like is proposed that includes a plurality of laminated layers between which a security element with a relief structure, in particular holographic diffraction structures, is embedded. The materials are selected so that the softening temperature of the security element layer having the relief structure has a higher softening temperature than the card layers between which the security element is laminated. This permits the multilayer laminated card to be produced by conventional laminating methods without appreciably impairing the relief structure by the pressures and temperatures thereby occurring. Special combinations of materials and in particular suitable materials for the layer having the relief structure are proposed.

20 Claims, 4 Drawing Sheets

U.S. PATENT DOCUMENTS

| | | | |
|---|---|---|---|
| 4,560,426 A | | 12/1985 | Moraw et al. |
| 4,597,814 A | | 7/1986 | Colgate, Jr. |
| 4,728,377 A | | 3/1988 | Gallagher |
| 5,104,471 A | * | 4/1992 | Antes et al. ............... 156/233 |
| 5,411,296 A | * | 5/1995 | Mallik ......................... 283/86 |
| 5,492,370 A | * | 2/1996 | Chatwin et al. ............ 283/110 |
| 5,820,971 A | | 10/1998 | Kaule et al. |
| 5,834,096 A | * | 11/1998 | Waitts ...................... 428/195.1 |
| 5,882,463 A | * | 3/1999 | Tompkin et al. ............ 156/234 |
| 6,120,882 A | * | 9/2000 | Faykish et al. ........... 428/195.1 |
| 6,210,777 B1 | * | 4/2001 | Vermeulen et al. ....... 428/195.1 |
| 6,294,241 B1 | * | 9/2001 | Kaule et al. ................. 428/138 |
| 6,471,247 B1 | * | 10/2002 | Hardwick et al. ............. 283/72 |
| 6,474,695 B1 | * | 11/2002 | Schneider et al. ............. 283/72 |
| 6,722,700 B1 | * | 4/2004 | Christen ..................... 283/107 |

FOREIGN PATENT DOCUMENTS

| | | |
|---|---|---|
| DE | 2512550 | 9/1976 |
| DE | 2907004 | 8/1980 |
| DE | 3308831 | 5/1984 |
| DE | 3942663 | 6/1991 |
| DE | 4406185 | 8/1995 |
| EP | 0013557 | 7/1980 |
| EP | 0201323 | 11/1986 |
| EP | 0400220 B1 | 5/1989 |
| EP | 0609683 | 8/1994 |
| EP | 0684908 | 12/1995 |
| EP | 0723878 | 7/1996 |
| EP | 0767210 | 4/1997 |
| EP | 0723878 B1 | 3/1999 |
| GB | 1502460 | 7/1975 |
| GB | 1541917 | 3/1979 |
| GB | 1541918 | 3/1979 |
| GB | 2129739 | 5/1984 |
| JP | 10105031 | 4/1998 |
| WO | 94/19201 | 9/1994 |
| WO | 95/09084 | 4/1995 |
| WO | 99/46133 | 9/1999 |
| WO | WO 0061379 A1 * | 10/2000 |

* cited by examiner

LAMINATED MULTI-LAYER CARD WITH AN INLAID SECURITY ELEMENT IN THE FORM OF RELIEF STRUCTURES

BACKGROUND

This invention relates to a multilayer card, in particular credit card, identity card, bank card or the like, having a security element with diffraction structures, in particular holographic relief structures, and to methods for producing the card.

It is commonly known to equip cards, in particular bank, credit or identification cards, with security elements in the form of holograms, kinegrams or the like. The security elements have very specific optical effects which are dependent on the viewing angle and can be checked visually without aids and whose production requires considerable technological effort. The presence of such a security element with the defined optical effects is evaluated as an authenticity criterion, i.e. the presence of such a security element is taken as an indication of the authenticity of the card.

Security elements having diffraction structures are usually glued on the outer surface of the cards. If this is done by the so-called hot stamping technique, as described in German laid-open print 33 08 831, these security elements cannot be removed from the card without destruction after being glued on the card. Transfer of an authentic security element from an e.g. expired card to a counterfeit new card can thus be excluded. However, it is disadvantageous that these elements, precisely because they have no inherent stability, are extremely thin and thus mechanically very sensitive. Such elements usually wear out relatively fast during use of the card, i.e. abrasion destroys the layer structure so that the specific optical effect resulting from the diffraction structures is lost. Although the security value of holograms, kinegrams, etc., for cards is rated relatively high, such security elements are thus not very suitable for cards with a given long duration, such as personal identification cards, passports, driver's licenses, etc.

There have been various attempts to embed security elements with diffraction structures in the inside of the card in order to avoid mechanical wear. However, it has turned out that customary holograms, kinegrams, etc., are either completely destroyed by the action of heat and pressure during the laminating process, or so greatly impaired in quality that further use is impossible. There are proposals to handle the card areas where the diffraction structures are embedded more gently during the laminating process than the areas having no diffraction structures. According to the proposals, these areas are exposed to less high temperatures and possibly also lower laminating pressure during production. However, such measures, as described e.g. in EP 0 013 557, could hardly reduce the degree of damage to the security elements. Instead, the less stressed card areas have a poorer film bond, which is visually recognizable and which tends to lead to splitting of the card layers in these areas as a result of bending stresses.

SUMMARY

The problem of the invention is therefore to propose multilayer, laminated cards with embedded relief structures that can be produced inexpensively and by conventional laminating methods and that better withstand the stresses in customary use of the card.

Accordingly, materials with significantly different softening temperatures are selected for the layer having the relief structure, on the one hand, and the card layers to be laminated, on the other hand.

Since the relief structure of the security element is present in a material (plastic or lacquer) that either has a comparatively high softening temperature by nature or is at least brought into a state with a high softening temperature after production of the relief structure, and since the films from which the card is laminated have a lower softening temperature relative thereto, it is ensured that the relief structure of the security element embedded between the films of the card is not, or at least not appreciably, affected by the temperatures and pressures occurring in the laminating process. The materials for the card films and for the relief structure must be selected so that the associated softening temperatures are at a sufficiently different level during lamination. Materials used for the films of the laminated card are thermoplastics, which have a low softening temperature by nature. Materials used for the relief structure can be plastics, lacquers or the like with a higher softening temperature, in particular thermosetting particular thermosetting plastics or cured lacquers or the like. In particular the crosslinked materials, such as cured lacquers, are especially suitable for the inventive use.

When using cover films of polycarbonate (PC), polyester (PET-A: amorphous polyethylene terephthalate) or polyvinyl chloride (PVC), especially suitable materials for the security element have proved to be crosslinked reaction lacquers or crystalline polyester.

Suitable crosslinked reaction lacquers are in particular radiation-curable lacquers (referred to in the following as "reaction lacquers"). Especially suitable ones have proved to be radically and cationically curing, in particular UV-radiation-curing, lacquers and blue-light-curing lacquers.

Fine relief structures can be incorporated into the aforementioned relief materials cost-effectively by embossing either into the thermoplastics or into the not yet crosslinked or only partly precrosslinked thermosetting plastics and lacquers.

There are diverse possibilities for incorporating the security element with the relief structures into the card to be laminated.

For example, the relief structure can be cold- or hot-embossed into a thermoplastic or not yet finally crosslinked thermosetting plastic layer. The thus embossed plastic layer is transferred or glued to a card film with or without a vacuum metalization.

On the other hand, the relief structure can be embossed into a not yet crosslinked lacquer layer that is present on a transfer film or support layer. Said lacquer layer, after curing, is transferred to a film of the card to be laminated for example by the hot stamping method with or without a transfer film and with or without a metal layer vapor-deposited on the relief structure.

It is also possible for the transfer band or support layer for the crosslinkable lacquer to be formed by a film of the card to be laminated itself. In this case the lacquer lacquer layer containing the diffraction structure is integrated in the card structure together with the support or transfer layer.

The aforementioned methods for embossing the relief into a lacquer layer and transferring the lacquer layer to a substrate including the previously mentioned special reaction lacquers are extensively described in EP 0 684 908 B1, the relevant disclosure of which is incorporated in the present application by reference. However, EP 0 684 908 B1 relates to the application of hologram structures to the surface of in particular paper substrates, such as bank notes. It has now surprisingly turned out that the methods and lacquers described therein are also applicable in corresponding fashion for the present purposes of producing multilayer cards with embedded hologram structures.

Tests have shown that the above-described combinations of materials make it possible to embed the security elements by conventional laminating methods. Due to the higher softening temperature of the plastic materials used for the security elements, in particular the microrelief thereof remains largely undamaged.

If the films used for the card structure show a stronger tendency to "flow" during the laminating process, however, it can happen that the security elements, if they are being used as very thin lacquer layers with a thickness smaller than 5 microns, have microtears after the laminating process that can still disturb the general impression. In these cases it is recommendable to embed the security elements together with a support film. As long as the security element together with the support film has a thickness of at least 10 microns, these effects (microtears) normally do not occur. As long as the security element including the support layer does not essentially exceed a thickness of about 30 microns, it can be integrated into the usual card structure without further additional measures. If, for whatever reasons, the security element is designed clearly thicker, e.g. with a thickness of 100 microns or more including the support layer, the place where the security element is to be added to the card structure must be taken into account by corresponding gaps, depressions, windows or the like. Such measures are unnecessary, however, if the support layer is provided as a whole-area film of the card structure according to a preferred embodiment. In this case, the sup-support layer can also be designed clearly thicker than 100 microns. The layer having the diffraction structures, by contrast, should not exceed a thickness of 10 microns if it is provided only in partial areas of the support layer.

In a further preferred embodiment, support layer and diffraction structure layer are provided over the whole area, whereby either only the areas where the optical diffraction effects are required are provided with the reflective metal layer, or the areas where no diffraction structures are to be present are overprinted or covered with opaque ink.

It is clear to the expert that a good bond between security element and the adjoining layers of the card structure is necessary for attaining a uniform optical general impression. This is obtained by carefully coordinating the individual layers with each other. If films, lacquers or printing inks are to be combined that bond poorly with each other in the laminating compound, additional adhesive layers that bond well with both materials should be provided between these layers. Such adhesives are known to the expert.

If a whole-area support layer is used, it can also be used as an inlay layer that bears the double-sided printed image of the card. If the support layer is of transparent design, one can homogeneously print partial areas, on the one hand, and leave partial areas free, on the other hand, to achieve the optical appearance of a usual card wherein a transparent window is provided in which a security element with optical diffraction structures can be recognized. If the security element has a metallic reflecting layer, it can be viewed from both sides but it is not possible to see through the "window" of the card. If such effects are desired, the metallic reflecting layer can be completely or partly left out. If only interruptions in the form of characters, patterns or the like are provided in the metal layer, an additional security effect is obtained since these interruptions can be checked in transmitted light, whereas the diffraction effects overlaying the total window are to be checked at the defined viewing angles.

If a consistently opaque support layer is used, diffraction structures can be provided on both sides of the support layer optionally in the same area of the card, which can then likewise be checked from both sides. In this case, the optical diffraction ef-diffraction effects on both sides can also have different diffraction effects, e.g. different holographic information.

If a whole-area diffraction structure layer is provided on the transparent support layer and overprinted with differently disposed window areas from both sides, the diffraction structure is visible in special areas only from one side and in other areas only from the other side. In cases where window areas are provided on both sides, the diffraction structure is recognizable at the same place from both sides.

The use of a whole-area support layer has very special advantages since it can be processed just like every other layer of the card structure. Regardless of whether the diffraction structures are provided on the whole or on part of the area, they can be glued on and embossed in placed fashion in the known way as film sheets or as rolls.

Further advantages and embodiments will be explained with reference to the figures. It is pointed out that the figures do not offer a true-to-scale representation of the invention but are only for illustration. The term "security element" used in the following text includes the lacquer or plastic layer into which the relief is embossed and, if present, the metal layer vapor-deposited on the relief, the protective layer, the transfer or support layer (if it is embedded in the card as well) and the adhesive layers connecting the security element with the adjoining layers of the multilayer card. Diffraction structures include all structures having optical diffraction effects, in particular holograms, kinegrams, moviegrams, pixelgrams, etc.

DETAILED DESCRIPTION OF VARIOUS EMBODIMENTS

Figure 1:
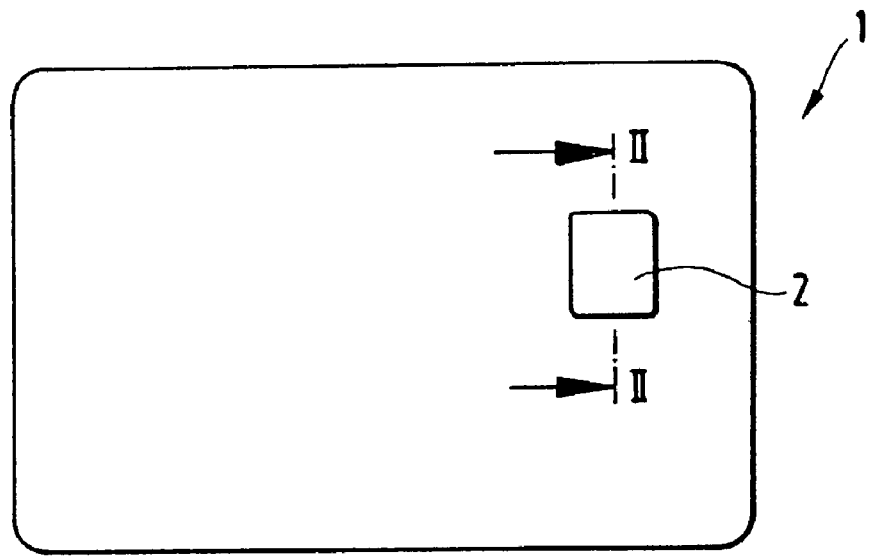
FIG. 1 shows an inventive multilayer, laminated card with an embedded security element in a plan view.

FIG. 1 shows a plan view of multilayer laminated card 1, for example a credit card, in which security element 2 with relief structures, in particular a hologram, is embedded. Additionally, the card has a double-sided printed image and optionally further elements and security structures such as a chip, signature stripe and the like, which are not shown in FIG. 1. Depending on the requirements, security element 2 can have the form of a thread or band or be designed as a label-like element (patch) with defined outline forms.

Figure 2:
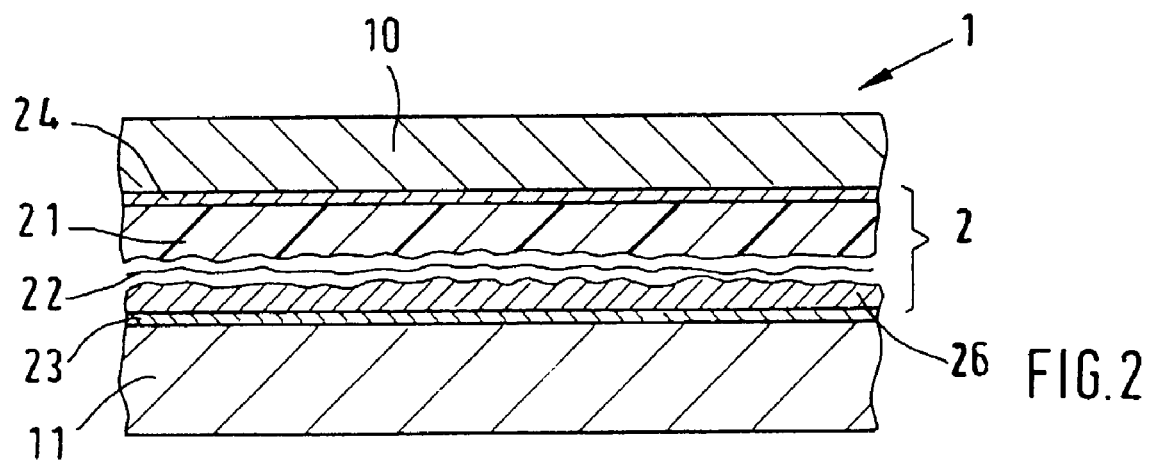
FIGS. 2-5 show sections through different cards with laminated-in security elements.

FIG. 2 shows a cross section through card 1 in the area of security element 2 according to a first embodiment of the invention. One can see card cover layers 10 and 11 with security element 2 embedded therebetween. Security element 2 comprises transparent relief layer 21 into which the relief forming the holographic diffraction structures is embossed, vapor-deposited metal layer 22 (optional) that enhances the optical effect of the diffraction structures, transparent protective lacquer layer 26 and the two likewise transparent adhesive layers 23 and 24 firmly connecting security element 2 with cover layers 10 and 11.

Cover layers 10 and 11 are transparent or at least have transparent window areas in the area of security element 2 so that the hologram is recognizable from both sides of the card. The holographic information is then recognizable mirror-inverted from the back, and visual three-dimensional effects are also inverse to each other depending on the manner of viewing.

FIG. 2 shows the simplest possible structure of a multilayer laminated card, including only two cover layers 10, 11. Further layers can be provided, in particular a usually opaque core layer. If an opaque core layer is provided as an additional layer, the hologram is only to be seen from one side, unless the opaque inlay has a transparent window area where the hologram is disposed.

Metal layer 22 vapor-deposited on relief layer 21 enhances the optical effect of the diffraction structures. It can also be provided only in a partial area; in particular it can have interruptions in the form of characters, patterns, images, logos or the like.

Security element 2 can also be overprinted with a printed image so that the hologram is visible only in the gaps of the printed image. The printed image can be executed with any desired inks. If inks are used that change color likewise in accordance with the viewing angle (e.g. inks with liquid crystal polymer pigments, iriodines or other viewing-angle-dependent inks), this effect can supplement the viewing-angle-dependent optical effect of the hologram.

As mentioned at the outset, the choice of material is of particular importance for the purposes of the present invention, in particular the choice of material for relief layer 21, since this layer must be sufficiently temperature- and pressure-resistant so as not to lose the relief structure in the laminating process. Cover layers 10, 11 have a low softening temperature compared to relief layer 21. Relief layer 21 consists of a plastic with an accordingly higher softening temperature, in particular of crosslinked, i.e. cured, duromer, or a crosslinked lacquer. The lacquers or lacquer systems are known from EP 0 684 908 B1.

Security element 2 shown in FIG. 2 has first lacquer layer 21 in which the diffraction structures are embossed, and metal layer 22, protective lacquer layer 26 and adhesive layers 23, 24. Relief layer 21 can be a plastic film into which the relief was embossed and which was then punched out, optionally after being metalized and coated with protective lacquer layer 26 and adhesive layers 23, to be embedded in the layer structure of card 1. Adhesive layer 24 is provided on cover film 10. Relief layer 21 can also be a crosslinked, in particular radiation-cured, lacquer which is initially present on a transfer film in the uncrosslinked or partly precrosslinked state and into which a relief structure is embossed, to be transferred to cover layer 11 without the transfer film by the hot stamping method after the lacquer cures. The transfer films with security elements 2 are embossed on endless webs for this purpose, so that security elements 2 can be applied to cover film 11 and then laminated with further cover film 10 in a continuous process involving detachment of the transfer film. This method is extensively described in EP 0 684 908 B1.

In the card structure shown in FIG. 2, security element 2 has a layer thickness of about 2 to 5 microns. The overall card structure has a thickness of 760 to 800 microns in the welded state of the single layers.

Figure 3:
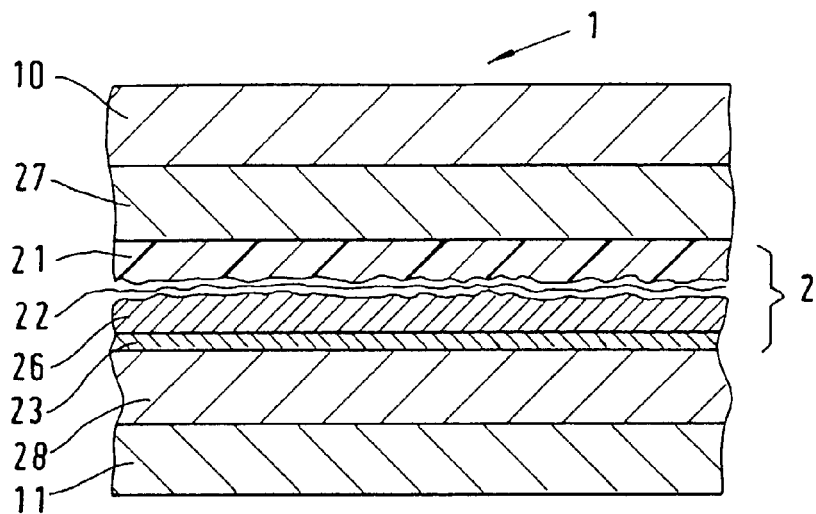

In FIG. 3 the card structure described in FIG. 2 is modified to the effect that two further films 27, 28 are provided besides security element 2 and cover films 10 and 11. Said internal card layers 27, 28 enclose security element 2. This card structure has the advantage that layers 27 and 28, being internal card layers, can be handled separately from the cover films. These layers usually have the printed image, whereby one of the two layers can also be of opaque design so that the card inlay is not transparent, as is commonly known.

In the card structure shown in FIG. 3, security element 2 is applied directly to film layer 27 since lacquer layer 21 was applied over the whole area or partially, the relief structure embossed thereinto, as described above, the lacquer cured, metal layer 22 vapor-deposited and finally the relief structure covered with further lacquer layer 26. To permit an intimate bond of the security element area with film 28 in the later laminating process, adhesive layer 23 can be additionally provided on lacquer layer 26. If the materials of lacquer layer 26 and film 28 permit an intimate bond in the laminating process, adhesive layer 23 can also be omitted.

Figure 4:
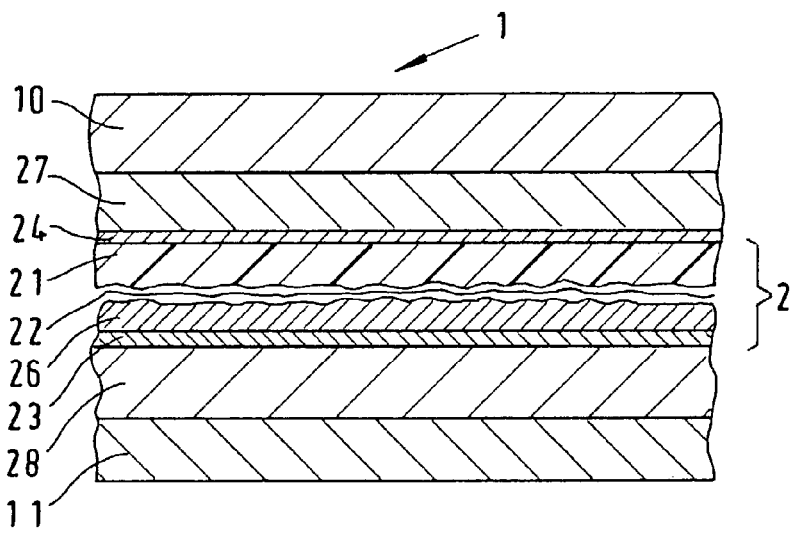

In FIG. 4 the card structure stated in FIG. 3 is modified to the effect that security element 2 was not produced directly on film 27 but is produced as a separate element that is transferred to film 27 by the transfer method. For this reason it can be expedient to provide adhesive layers 23 and 24 on both sides of the security element for the transfer process, on the one hand, and for the laminating process, on the other hand.

Figure 5:
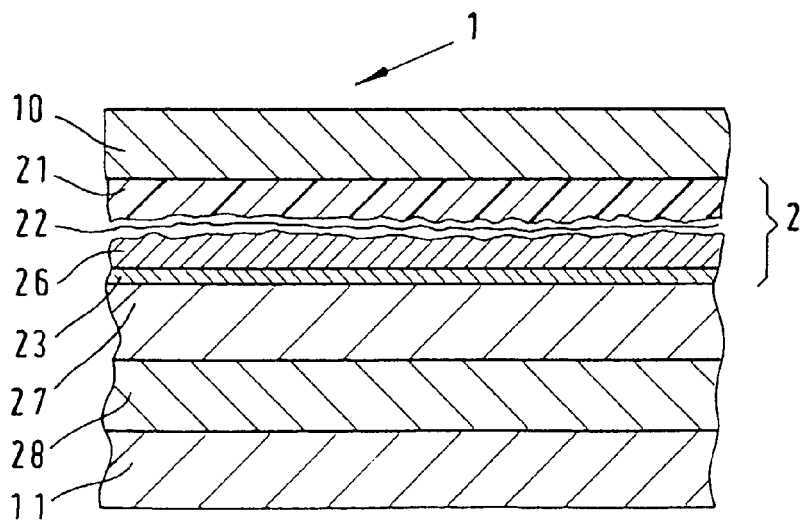

FIG. 5 shows a further variant of the card structure wherein security element 2 is applied to the side of the inlay consisting of films 27, 28 that faces a cover film. In this case, both films 27 and 28 can be of opaque design. Security element 2 can be produced both on the film itself (see FIG. 3) or be transferred as a prepared transfer ele-element to the surface of film 27 (see FIG. 4). In the present case, the security element is designed as a transfer element and fixed on film 27 with adhesive layer 24.

In FIGS. 3, 4 and 5 the card inlay has two films 27 and 28. This has the advantage that the card, whose overall thickness is standardized, consists of single layers having a thickness that can be processed easily. It is also possible to provide further layers in the card structure, thereby permitting the thickness of the single layers to be reduced further. This seems expedient in particular when a relatively thick security element of for example 100 microns or more is to be used and a gap is to be provided therefor in the card structure. In this case, the film in which the gap is incorporated should have roughly the thickness of security element 2. Although the inventive card structure makes it basically possible to integrate the security element into the card structure and process it in the laminating process without any further precautions, it is still expedient not to embed security elements of any thickness into the layer structure during the laminating process. Practice has shown that the film material, even in the heated state, cannot be displaced or compressed in any quantity for embedding additional elements. Even if it was possible (e.g. by increasing laminating pressure and laminating temperature), the "flowing away" of the film material would cause a change, i.e. distortion, of the printed image, thereby reducing the card quality as a whole. By providing a gap this can be avoided since the laminating process must then only effect the intimate bond of the card layers and no, or little, compression or displacement of film material is necessary.

Figure 6:
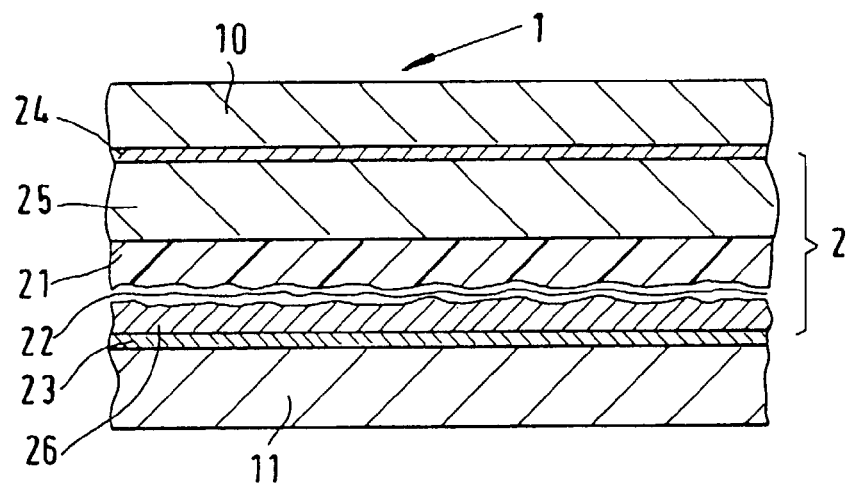
FIG. 6 shows a variant of the security element according to FIG. 2, here with a support layer.

FIG. 6 shows a further embodiment of the invention wherein security element 2 includes layer 21 with a relief structure in a crosslinked lacquer and support layer 25 for the crosslinked lacquer. Otherwise the structure of card 1 corresponds to the structure described in FIG. 2. In the present case, security element 2 consists substantially of lacquer layer 21 (with relief structure), metal layer 22, protective lacquer layer 26 and support layer 25. The incorporation of security element 2 between cover films 10, 11 can be effected similarly to the incorporation of security element 2 described with reference to FIG. 2 when security element 2 is embedded as a label-like element (patch). In a preferred embodiment, however, support layer 25 has the format of the card, i.e. the support layer is integrated in the card over the whole area. Layers 21, 22, 26 are 21, 22, 26 are directly connected with support layer 25. The thickness of layers 21, 22, 26 is smaller than 10 microns, preferably about 2 to 5 microns, the overall thickness of security element 2 (with support layer 25) is about 30 microns.

The layer structure of card 1 is to be selected, as mentioned above, so that the individual layers are interconnected preferably homogeneously at the laminating temperature coordinated with the layer structure, the associated laminating pressure and the defined laminating time, but without destroying the microrelief of the hologram.

This goal can be reached according to the invention by the combination of very different materials as long as it is ensured that the layers of the card structure become sufficiently "soft" during the laminating process to bond well in the boundary layers but the layer bearing the relief remains so stable that the microrelief is not deformed or reversed.

The following table compiles the softening temperatures of some film materials (PET: polyethylene terephthalate; ABS: acrylonitrile-butadiene-styrene):

| Film material | Softening temperature [° C.] |
|---|---|
| PC | 146-148 |
| Thermoplastic polyester | 74-76 |
| PVC | 65-80 |
| ABS | 90 |
| Crystalline PET | >200 |

The lacquer used for layers 21, 26 has a softening temperature greater than 240° C. It is thus clearly more temperature-stable than the film materials stated in the table.

The further table now states some combinations of materials, together with the laminating temperature of the laminating plant, that can be used for producing cards with embedded security elements.

| Cover film/Inlay | Support film | Laminating temperature |
|---|---|---|
| Polycarbonate | Crystalline PET | about 175° C. |
| Thermoplastic polyester | PC or cryst. PET | about 130° C. |
| PVC | PC or cryst. PET | about 150° C. |
| ABS | PC or cryst. PET | about 140° C. |

Figure 7:
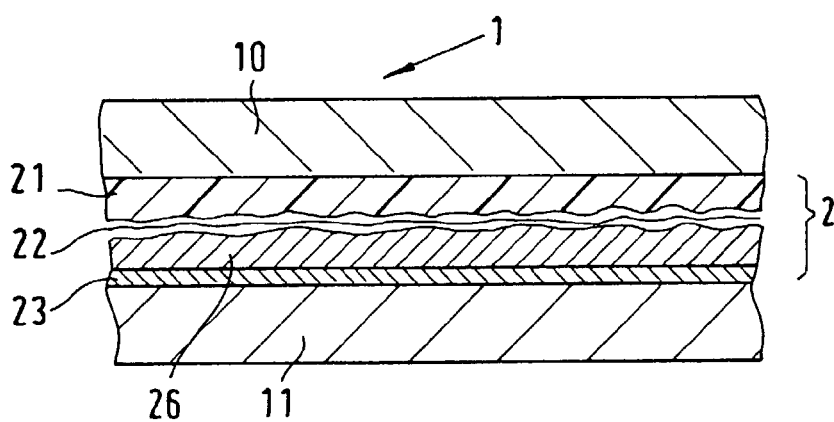
FIG. 7 shows a variant of the security element according to FIG. 2 wherein the security element has been produced directly on a card film.

FIG. 7 shows a further embodiment of the present invention wherein relief layer 21 is again present as a crosslinked lacquer. In this case, relief layer 21 was not produced on a transfer band, cured and then transferred, but relief layer 21 was produced directly on cover layer 10. That is, cover layer 10 formed the carrier or support layer for lacquer layer 21 during embossing of the relief structure into the not yet crosslinked lacquer layer. In this production variant, security element 2 can be produced on cover layer 10, provided with metal layer 22 and covered with protective lacquer layer 26. When metal layer 22 is provided, protective layer 26 preferably consists of the same reaction lacquer as relief layer 21.

If metal layer 22 is omitted in the present example or the other embodiments, protective lacquer layer 26 must consist of a different lacquer from that used for layer 21. This lacquer must have a refractive index preferably differing from relief layer 21 so that the optical diffraction effects are still perceptible. This different lacquer should likewise have a higher softening temperature than the cover or inlay films.

The continuous method for applying security element 2 to a substrate, here cover layer 10, is likewise described in EP 0 684 908 B1, the relevant disclosure of which is incorporated herein by reference.

Figure 8:
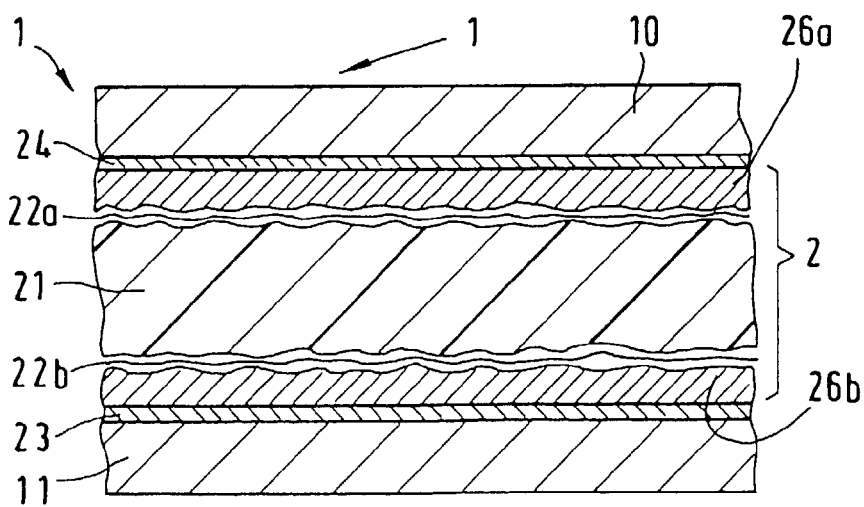
FIG. 8 shows a variant of the security element according to FIG. 2 with two opposing relief structures.
Figure 9:
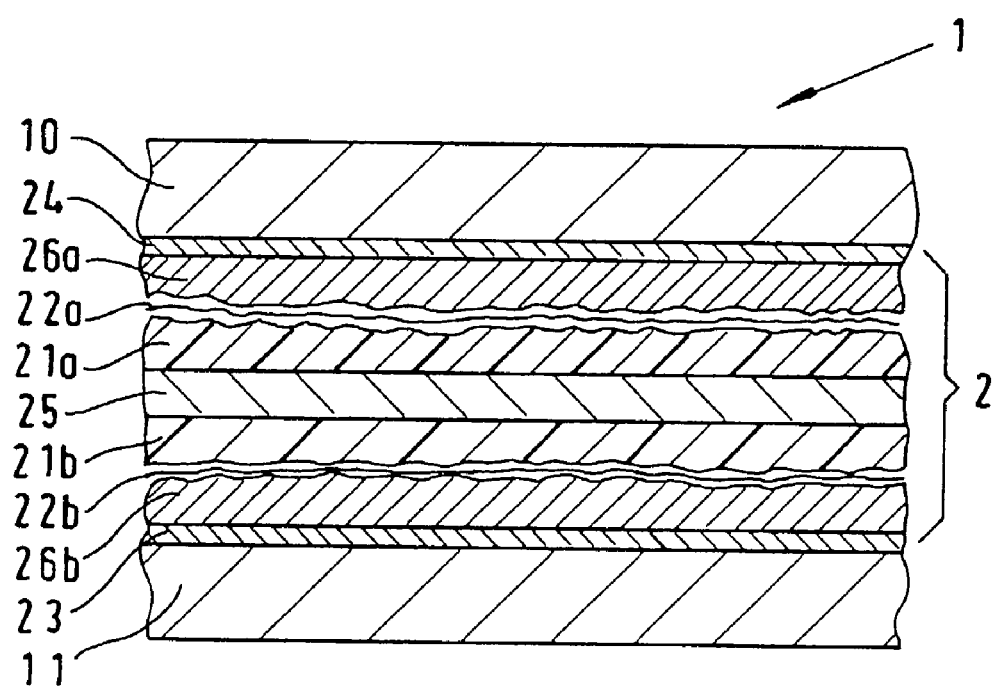
FIG. 9 shows a variant of the security element according to FIG. 6 with a support layer and likewise two opposing relief structures.

FIGS. 8 and 9 show two further embodiments of the invention wherein security element 2 is equipped with relief structures and optionally metallic coatings 22a, 22b and protective lacquer layers 26a, 26b on opposing sides. Cover layers 10, 11 and adjoining adhesive layers 23, 24 are therefore to be of transparent design at least in the area of the relief structures. In the embodiment of FIG. 8, relief layer 21 consists of a plastic material with a comparatively high softening temperature, preferably of crystal-crystalline polyester or polycarbonate (PC). Security element 2 has a thickness of 30 microns for example.

Security element 2 according to the embodiment of FIG. 9 instead includes central support layer 25 with a thickness of about 90 microns on both sides of which lacquer layers 21a, 21b with relief structures, metal layers 22a, 22b and protective lacquer layers 26a, 26b are applied.

The security element has a thickness of about 100 microns. While a one-sided relief structure is usually produced by means of one embossing cylinder, the opposing relief structures according to FIGS. 8 and 9 can be produced for example simultaneously by guiding the material to be embossed through the gap of two opposing embossing cylinders. Both reliefs are then provided with the metal layers and covered with the protective lacquer layers.

Numerous other embodiments are possible for realizing the inventive solution. The inventive solution makes it possible for the first time to laminate security elements with relief structures, in particular holographic diffraction structures, into a multilayer card without appreciably impairing the relief structures during lamination of the card. The selected materials with different softening temperatures permit the security element to remain inherently stable at the laminating temperatures that occur so that it requires no additional protection during the laminating process. Especially good results have been achieved with the stated materials and combinations of materials. The security element embedded in the multilayer card is not exposed to direct mechanical stress and thus not subject to direct wear in later use, so that the life of the security element corresponds to the life of the card.

The invention claimed is:

1. A card comprising a plurality of laminated layers between which a security element with a relief structure, such as holographic diffraction structures, is embedded, wherein the relief structure comprises at least one relief carrying layer selected from the group consisting of plastic and lacquer, said relief carrying layer having a higher softening temperature than said laminated layers of the card between which the security element is embedded.

2. The card according to claim 1, wherein the relief carrying layer is a crosslinked reaction lacquer.

3. The card according to claim 2, wherein the reaction lacquer is selected from the group consisting of radically, cationically and blue-light-curing lacquers.

4. The card according to claim 3, wherein the lacquer is cationically or radically curable, and the lacquer is a UV-curable lacquer.

5. The card according to claim 2, wherein the security element, comprises the relief carrying layer, a protective lacquer layer and a further support layer connected with the relief carrying layer.

6. The card according to claim 1, wherein the material of the relief carrying layer is plastic and is selected from the group consisting of crystalline polyethylene terephthalate (PET) and polycarbonate (PC).

7. The card according to claim 5, wherein the protective lacquer layer comprises a crosslinked reaction lacquer.

8. The card according to claim 1, wherein the security element is transparent.

9. The card according to claim 8, wherein the security element is printed on one side.

10. The card according to claim 8 wherein the security element has additional optical effects selected from the group consisting of printed images produced with liquid crystal polymers, iriodines or other viewing-angle-dependent inks.

11. The card according to claim 1, wherein the relief structure of the relief carrying layer is metal-coated.

12. The card according to claim 11, wherein the metal coating of the relief structure includes visually recognizable interruptions.

13. The card according to claim 12, wherein the interruptions of the metal coating are provided in the form of elements selected from the group consisting of characters, logos and patterns.

14. The card according to claim 1, wherein the security element is disposed in a transparent window of the card so that it is recognizable from both sides of the card.

15. The card according to claim 14, wherein the security element includes a support layer provided on each side with a relief carrying layer.

16. The card according to claim 14, wherein the relief carrying layer includes a plurality of relief structures each relief structure is covered by a protective lacquer layer.

17. The card according to claim 1, including adhesive layers between the security element and adjoining layers of the card.

18. The card according to claim 1, wherein the relief structure is embossed into the relief carrying layer.

19. The card according to claim 2, wherein the lacquer layer directly adjoins another layer of the card.

20. The card according to claim 1, wherein the relief carrying layer and the laminated layers are formed from materials having different softening temperatures, the relief carrying layer is constructed from at least one material which is not affected by temperatures and pressure exerted thereon upon embedding the security element between the laminated layers.

* * * * *

UNITED STATES PATENT AND TRADEMARK OFFICE
CERTIFICATE OF CORRECTION

PATENT NO. : 7,637,537 B2  Page 1 of 1
APPLICATION NO. : 10/203619
DATED : December 29, 2009
INVENTOR(S) : Keller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1177 days.

Signed and Sealed this

Twenty-first Day of December, 2010

David J. Kappos
*Director of the United States Patent and Trademark Office*